United States Patent
Hu et al.

(10) Patent No.: US 10,900,498 B1
(45) Date of Patent: Jan. 26, 2021

(54) COMPRESSOR AND METHOD FOR OPERATION OF A COMPRESSOR

(71) Applicant: Ford Global Technologies, LLC, Dearborn, MI (US)

(72) Inventors: Leon Hu, Bloomfield Hills, MI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/563,665

(22) Filed: Sep. 6, 2019

(51) Int. Cl.
| | |
|---|---|
| F04D 29/66 | (2006.01) |
| F02B 33/16 | (2006.01) |
| F02B 37/12 | (2006.01) |
| F02B 33/40 | (2006.01) |
| F04D 27/00 | (2006.01) |
| F04D 17/10 | (2006.01) |
| F04D 29/68 | (2006.01) |

(52) U.S. Cl.
CPC .............. *F04D 29/66* (2013.01); *F02B 33/16* (2013.01); *F02B 33/40* (2013.01); *F02B 37/12* (2013.01); *F04D 17/10* (2013.01); *F04D 27/009* (2013.01); *F04D 29/68* (2013.01)

(58) Field of Classification Search
CPC .......... F02B 33/16; F02B 33/40; F02B 37/12; F04D 17/10; F04D 27/009; F04D 29/66; F04D 29/68
USPC ....................................................... 123/434
See application file for complete search history.

(56) References Cited

U.S. PATENT DOCUMENTS

| | | | |
|---|---|---|---|
| 3,262,516 A * | 7/1966 | Borgeson | F01N 13/1855 181/268 |
| 4,108,275 A * | 8/1978 | Black | F01N 1/10 181/252 |
| 7,017,706 B2 | 3/2006 | Brown et al. | |
| 9,951,793 B2 | 4/2018 | Lucas | |
| 10,024,228 B2 | 7/2018 | Gong et al. | |
| 2008/0292449 A1* | 11/2008 | Lefevre | F04D 29/685 415/58.4 |
| 2010/0061840 A1* | 3/2010 | Gu | F04D 27/0207 415/145 |
| 2010/0230204 A1* | 9/2010 | Inoue | F01N 1/04 181/255 |
| 2011/0085902 A1* | 4/2011 | Yin | F04D 29/685 415/208.2 |
| 2017/0370361 A1* | 12/2017 | Arnold | F04D 17/10 |

FOREIGN PATENT DOCUMENTS

| | | | |
|---|---|---|---|
| CN | 104389677 A | | 3/2015 |
| CN | 208702493 U | * | 4/2019 |

* cited by examiner

*Primary Examiner* — Mahmoud Gimie
(74) *Attorney, Agent, or Firm* — Geoffrey Brumbaugh; McCoy Russell LLP

(57) ABSTRACT

Compressors and methods for operating compressors are provided. In one example, a compressor is provided that comprises a ported shroud including a first port positioned upstream of a leading side of a rotor and a second port positioned downstream of the leading side of the rotor. The compressor also includes a muffler arranged in the ported shroud and comprising a plurality of projections, each of the plurality of projections radially extend from a base of the muffler and include an aperture extending through the base.

20 Claims, 5 Drawing Sheets

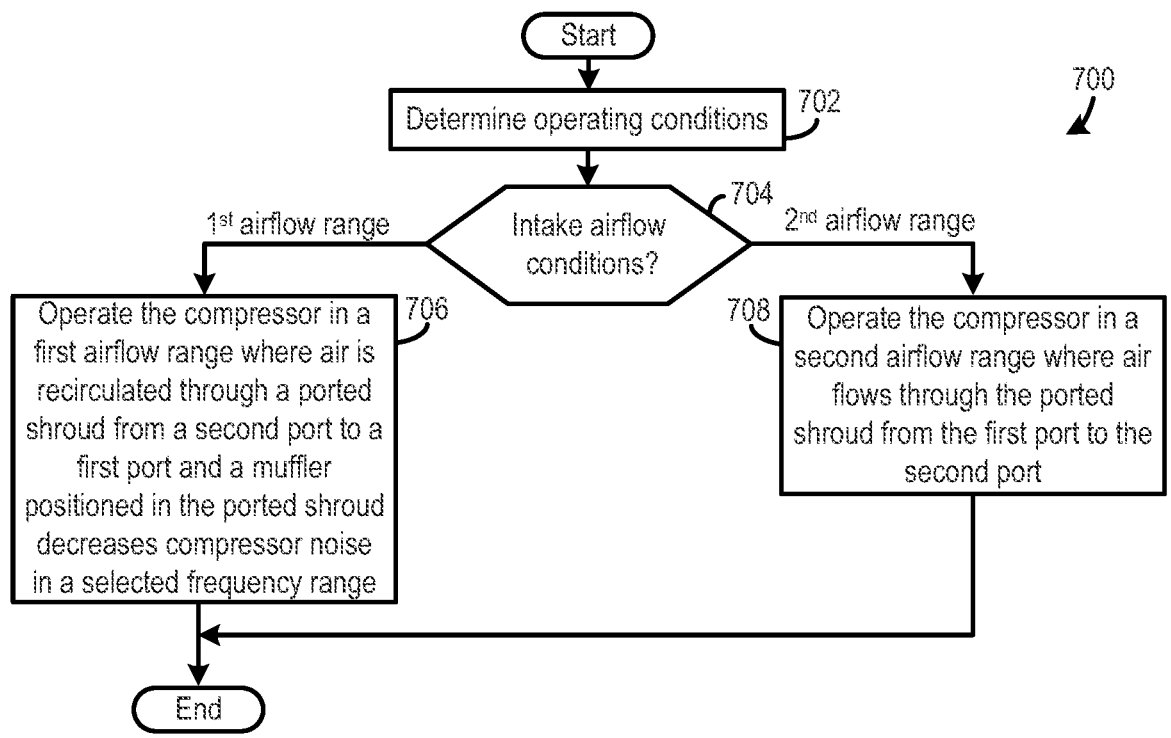

COMPRESSOR AND METHOD FOR OPERATION OF A COMPRESSOR

FIELD

The present description relates generally to a compressor in an engine and a method for operation of said compressor.

BACKGROUND/SUMMARY

Vehicles have incorporated compressors into engines to increase engine output and efficiency by forcing compressed air into engine cylinders. However, compressors may experience surge when throttling is increased and the pressure in the compressor rises above desired levels. Compressor surge can in turn damage components in the compressor caused, for example, by stored pressurized air decompressing and flowing upstream across the impeller.

To reduce surge and increase the compressor's operating range, ported shrouds have been incorporated into the compressor. One example approach of incorporating a ported shroud into a compressor is shown by Lucas in U.S. Pat. No. 9,951,793 B2. In Lucas' compressor a ported shroud is used to enable backflow through the shroud when the compressor approaches surge. Additionally, in Lucas' compressor adjustable airfoils are used to alter flow characteristics of the ported shroud.

However, the inventors have recognized several drawbacks with Lucas' compressor system. For instance, unwanted noise may be generated in the compressor which may be particularly loud when, for instance, reverse flow conditions through the ported shroud occur. The noise issue may be exacerbated in engines where the compressors are operated with higher boost, due to engine down speeding. Furthermore, the adjustable airfoils in the compressor may be susceptible to degradation, thereby decreasing compressor longevity and increasing manufacturing costs. In other previous compressor designs attempts have been made to reduce compressor noise via mufflers. However, the mufflers significantly increase losses in the compressor, thereby decreasing engine efficiency.

To address at least some of the abovementioned problems, a compressor is provided, in one example. The compressor comprises a ported shroud including a first port positioned upstream of a leading side of a rotor and a second port positioned downstream of the leading side of the rotor. The compressor further comprises a muffler arranged in the ported shroud and comprising a plurality of projections, where each of the plurality of projections radially extend from a base of the muffler and include an aperture extending through the base. The muffler projections allows noise in the compressor to be reduce during for example, recirculation flow conditions in the ported shroud.

In one example, when the compressor is operating in a first airflow range, air is recirculated through the ported shroud from the second port to the first port and the muffler decreases compressor noise in a selected frequency range. Additionally, when the compressor is operating in a second airflow range, air flows through the ported shroud from the first port to the second port and the muffler. In this way, the muffler can reduce noises in targeted frequency ranges during reverse airflow conditions and allow air to flow downstream through the ported shroud through other conditions. During the reverse airflow conditions the muffler also increases pressure losses that will reduce the recirculation flow rate which may at least partially offset the adverse effects of the increased pressure loss.

In another example, a first side of each of the plurality of projections includes a tip of the projection is axially positioned further away from the rotor than a second side of each of the plurality of projections opposing the first side. In such an example, each of the plurality of projections may include an inner curved surface and an outer curved surface. Shaping the plurality of projections in this manner decreases the flow losses caused by the muffler when air is flowing downstream through the ported shroud from the first port to the second port. In this way, losses may be reduced when air is flowing downstream through the shroud while also reducing noise generated in the compressor when air is recirculation upstream through the shroud.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a method for operation of a compressor.

FIGS. 2-6 are drawn to scale. However, other relative dimensions of the components may be used, in other embodiments.

DETAILED DESCRIPTION

Figure 1:
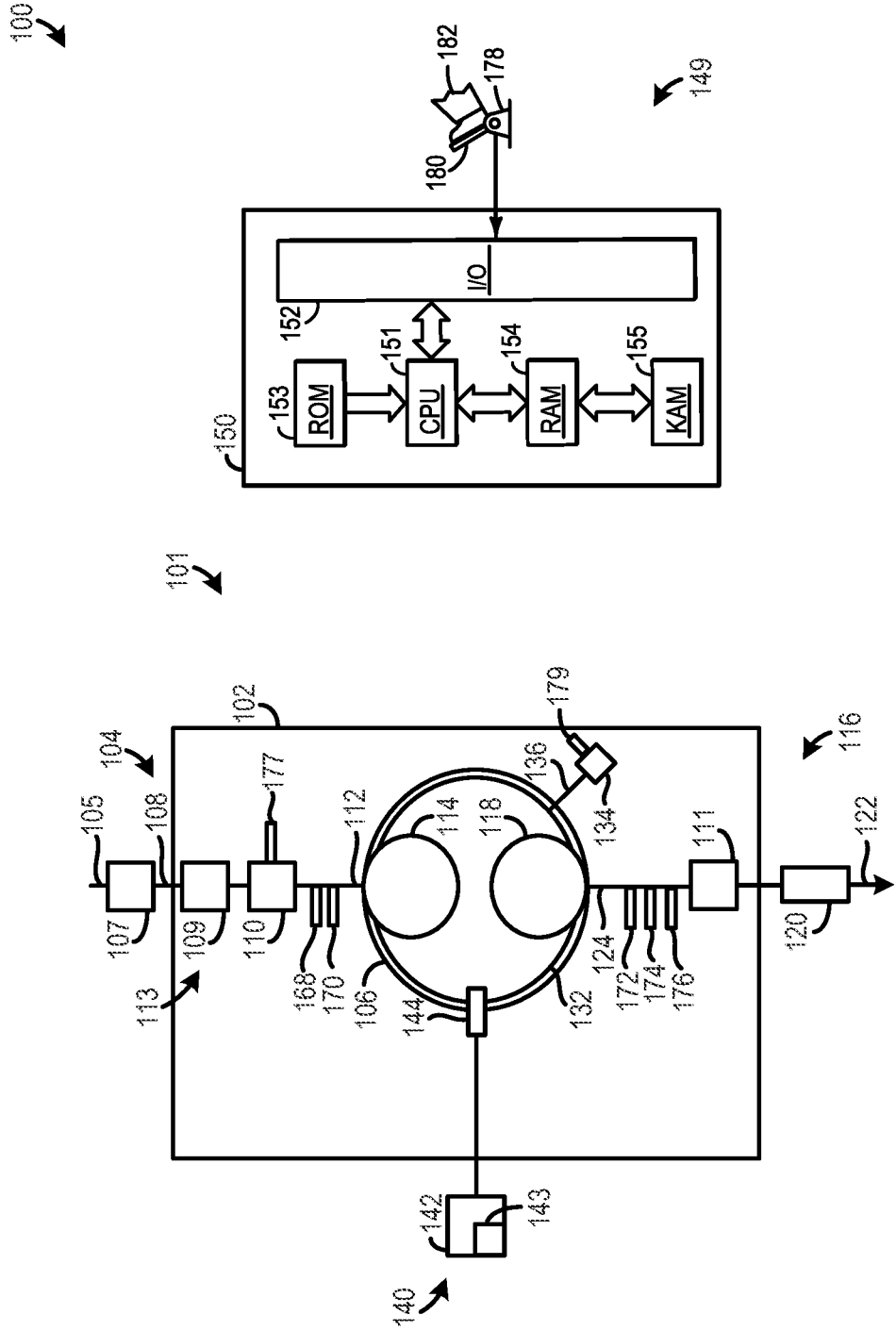
FIG. 1 shows a schematic depiction of a vehicle with an engine having a compressor.
Figure 2:
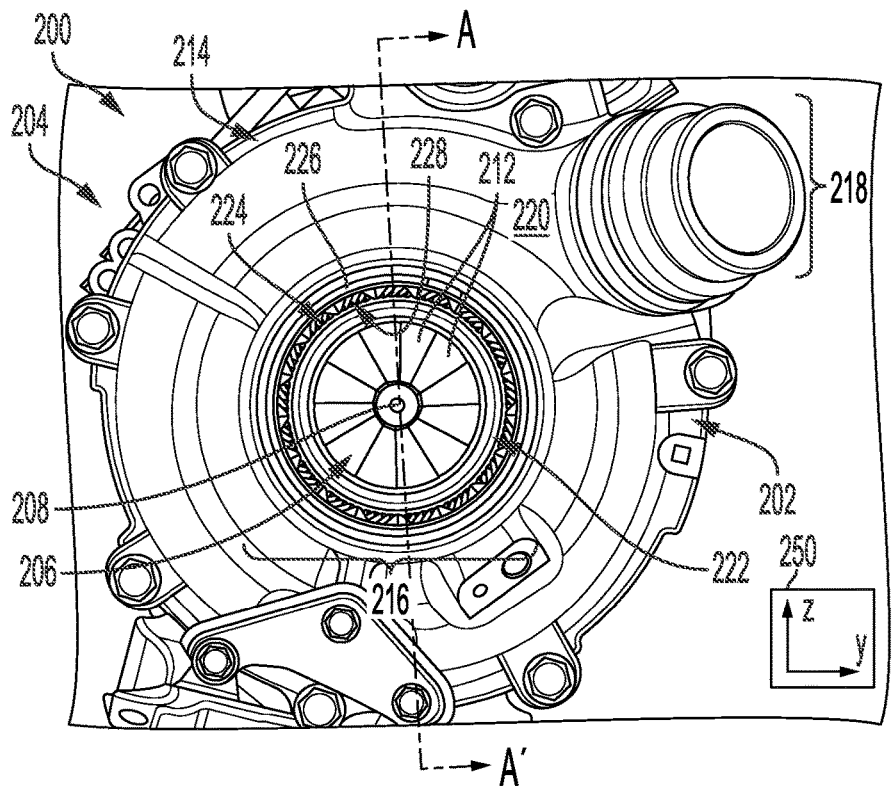
FIG. 2 shows an example of a compressor.
Figure 3:
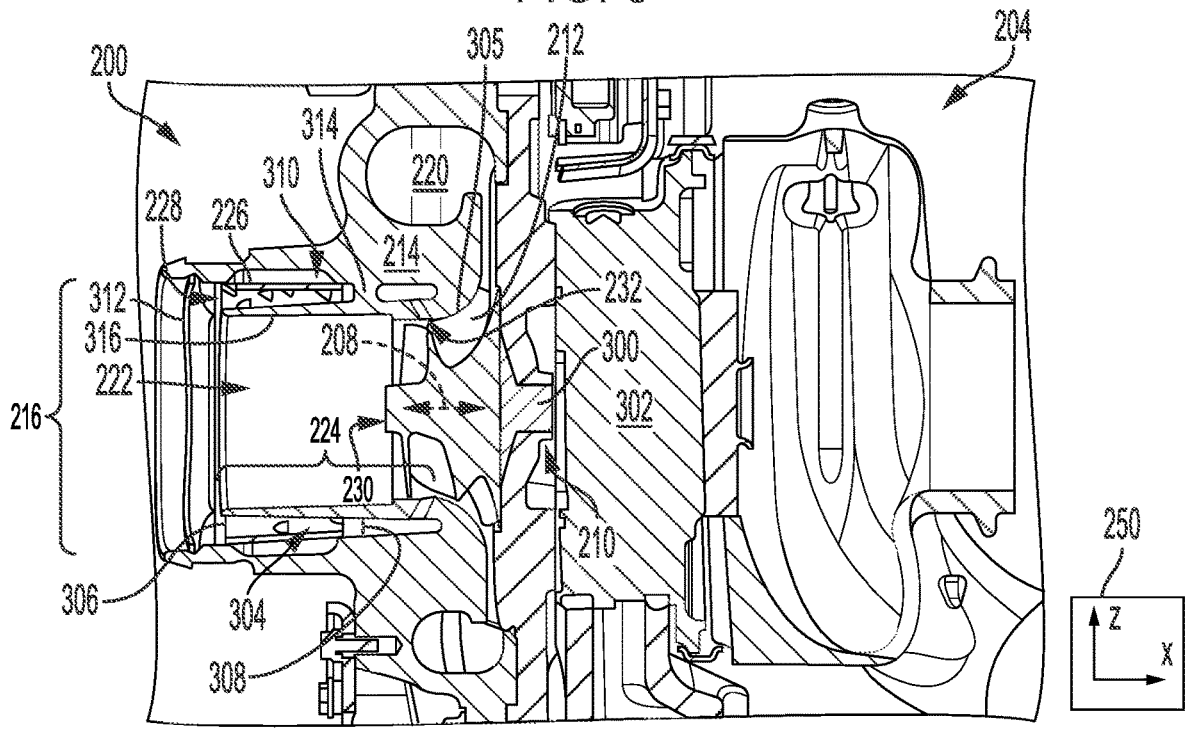
FIG. 3 shows a cross-sectional view of the compressor, depicted in FIG. 2.
Figure 4:
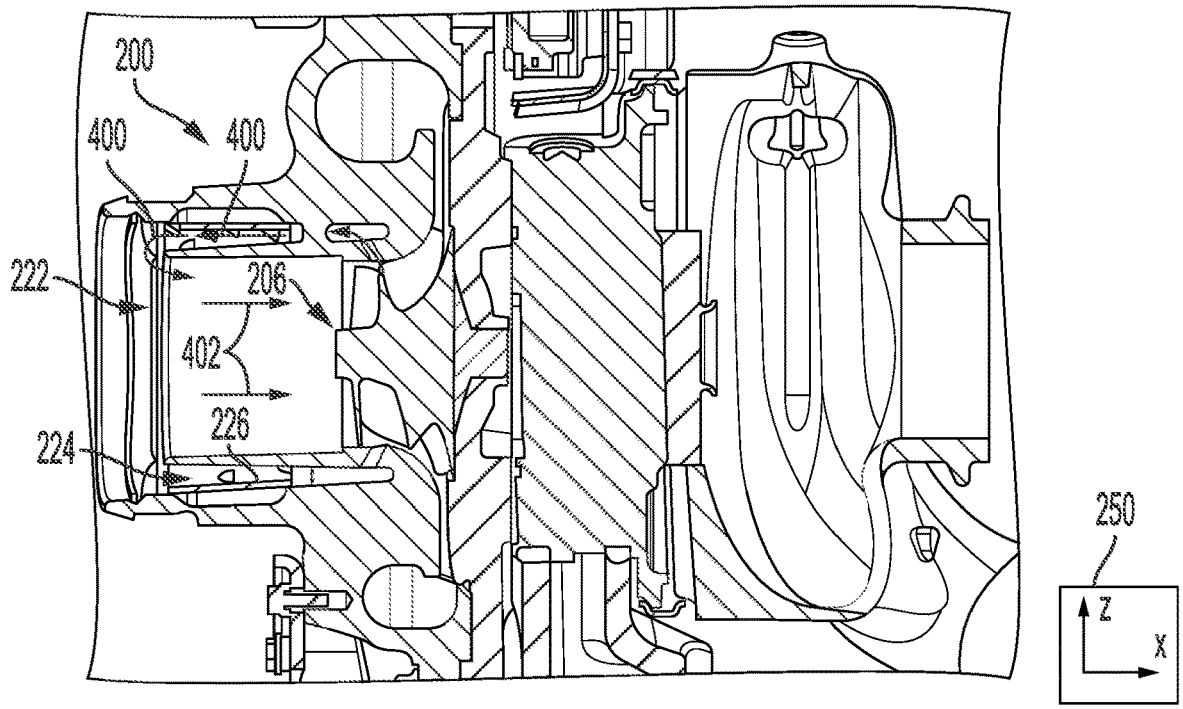
FIG. 4 shows the compressor depicted in FIG. 3 with a reverse flow pattern occurring in the ported shroud.
Figure 5:
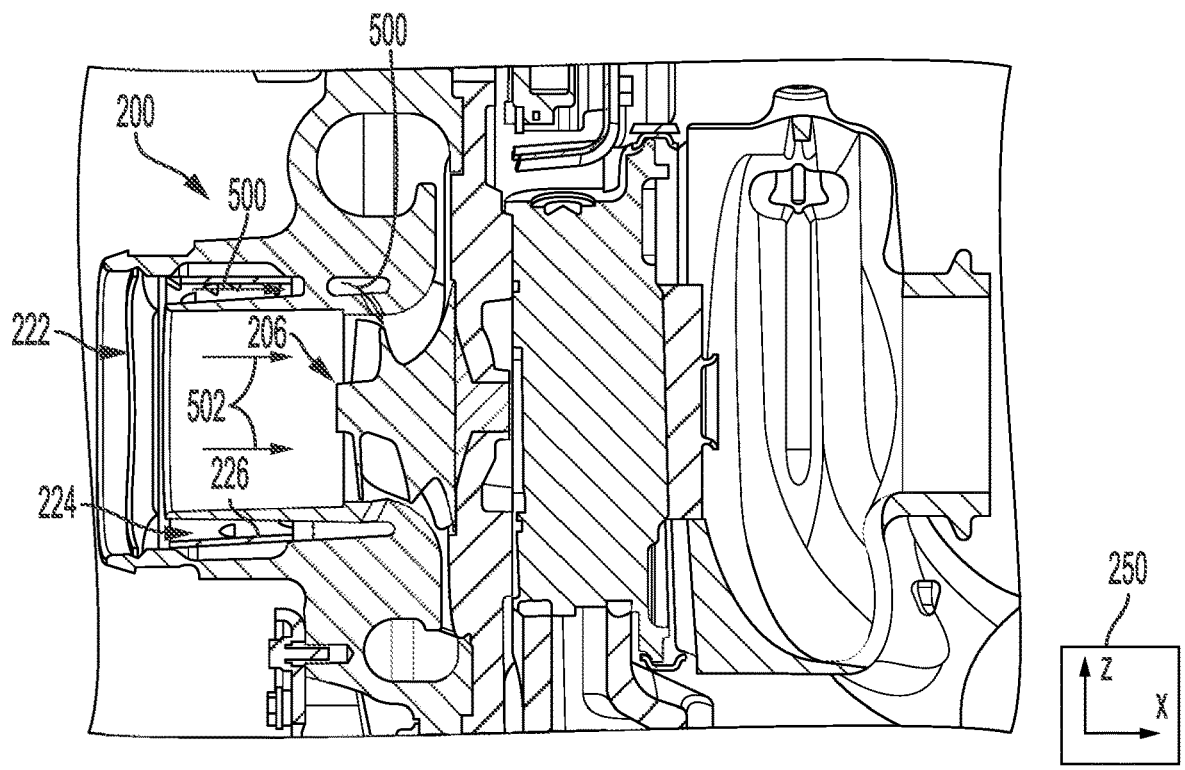
FIG. 5 shows the compressor depicted in FIG. 3 with a downstream flow pattern occurring in the ported shroud.
Figure 6:
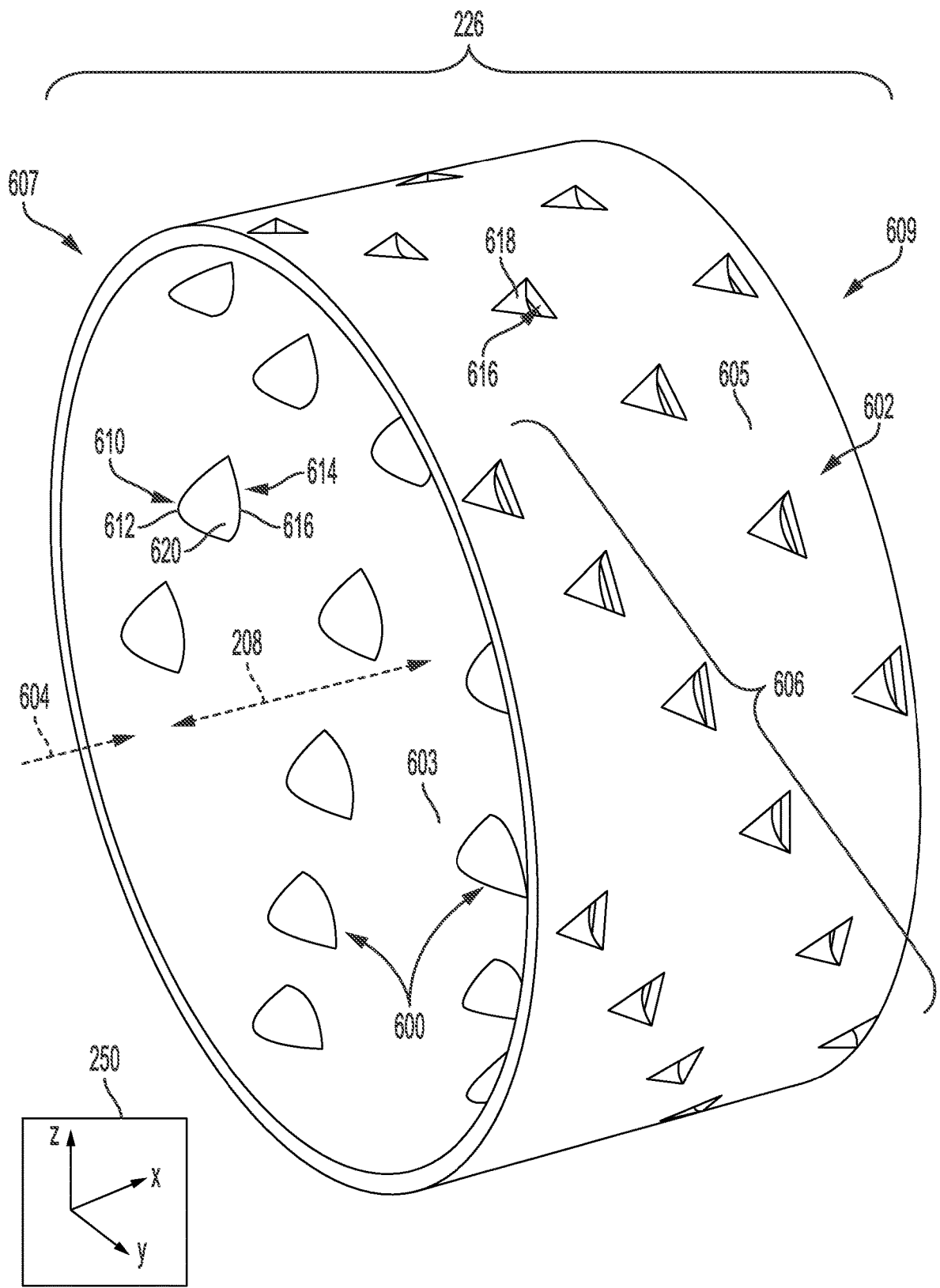
FIG. 6 shows a detailed view in the muffler in the compressor, depicted in FIG. 2.

A compressor in an engine is described herein with a muffler in a ported shroud. The muffler reduces noise generate in the compressor but also reduces flow losses caused by the muffler. FIG. 1 shows a schematic depiction of an engine with the compressor to provide an operating environment in which the compressor may reside. FIG. 2 shows a first example of a muffler in a ported shroud of a compressor designed to reduce noise emanating from the compressor. FIG. 3 shows a cross-sectional view of the compressor, shown in FIG. 2. FIGS. 4 and 5 show the compressor with upstream and downstream flow patterns occurring in the ported shroud. During upstream flow a muffler in the ported shroud decreases noise generated in the compressor and during downstream flow losses caused by the muffler are reduced due to the profile of the projections in the muffler. FIG. 6 shows a detailed view of the muffler. FIG. 7 shows a method for operation of a compressor.

FIG. 1 shows a schematic representation of a vehicle 100 including a vehicle powerplant 101 which may include an internal combustion engine 102 and the corresponding systems. Additionally, in some examples, the powerplant 101 may include an electric motor. Thus, in these examples the vehicle may be a hybrid vehicle. Although, FIG. 1 provides a schematic depiction of various vehicle and engine components, systems, etc., it will be appreciated that at least some of the components may have different spatial positions and greater structural complexity than the components shown in FIG. 1.

An intake system 104 providing intake air to a cylinder 106, is also depicted in FIG. 1. It will be appreciated that the cylinder may include a combustion chamber. A piston 132 is positioned in the cylinder 106. The piston 132 is coupled to a crankshaft 134 via a piston rod 136 and/or other suitable mechanical component. It will be appreciated that the crankshaft 134 may be coupled to a transmission which provides motive power to a drive wheel. Although, FIG. 1 depicts the engine 102 with one cylinder. The engine 102 may have additional cylinders, in other examples. For instance, the engine 102 may include a plurality of cylinders that may be positioned in banks.

During engine operation, the cylinder 106 may undergo a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

The intake system 104 includes an intake conduit 105 coupled to an air filter 107. Additionally, in the intake system 104, an intake conduit 108 extends between the air filter 107 and a compressor 109. However, other intake system arrangement have been envisioned.

The compressor 109 may, in one example, be driven via a turbine 111. In such an example, the compressor and turbine form a turbocharger 113 and a shaft and/or other suitable component transfers rotational energy from the turbine to the compressor. In another example, the compressor 109 may be driven via the crankshaft 134, an electric motor, etc. The compressor 109 may include a ported shroud and muffler designed to reduce noise generated in the compressor. Detailed illustrations of an example of a compressor and muffler are shown in FIGS. 2-6 and discussed in greater detail herein. Therefore, it will be understood that the compressor 109 shown in FIG. 1 has greater structural complexity than is illustrated in the figure. A bypass conduit and valve may be included in the intake system 104 to allow the flowrate of air through the compressor 109 to be adjusted, in one example. Additionally or alternatively, a wastegate conduit with a wastegate valve may be included in the exhaust system 116 to allow the flowrate of exhaust gas through the turbine 111 to be adjusted.

The intake system 104 further includes a throttle 110 in intake conduit 112, downstream of the compressor 109. The throttle 110 is configured to regulate the amount of airflow provided to the cylinder 106. For instance, the throttle 110 may include a rotatable plate varying the flowrate of intake air passing there through. In the depicted example, the throttle 110 feeds air to an intake conduit 112 (e.g., intake manifold). In turn, the intake conduit 112 directs air to an intake valve 114. The intake valve 114 opens and closes to allow intake airflow into the cylinder 106 at desired time periods. Further, in other examples, such as in a multi-cylinder engine additional intake runners may branch off the intake conduit 112 and feed intake air to other intake valves. It will be appreciated that the intake conduit 112 and the intake valve 114 are included in the intake system 104. Moreover, the engine shown in FIG. 1 includes one intake valve and one exhaust valve. However, in other examples the cylinder 106 may include two or more intake and/or exhaust valves.

An exhaust system 116 configured to manage exhaust gas from the cylinder 106 is also included in the vehicle 100, depicted in FIG. 1. The exhaust system 116 includes an exhaust valve 118 designed to open and close to allow and inhibit exhaust gas flow to downstream components from the cylinder. For instance, the exhaust valve may include a poppet valve with a stem and a valve head seating and sealing on a cylinder inlet in a closed position.

The exhaust system 116 also includes an emission control device 120 coupled to an exhaust conduit 122 downstream of another exhaust conduit 124 (e.g., exhaust manifold). The emission control device 120 may include filters, catalysts, absorbers, combinations thereof, etc., for reducing tailpipe emissions. The engine 102 in one example, may perform compression ignition. Additionally or alternatively, the engine may include an ignition system with an energy storage device, ignition device (e.g., spark plug), etc.

A fuel delivery system 140 is also shown in FIG. 1. The fuel may be gasoline, diesel, alcohol, combinations thereof, etc. The fuel delivery system 140 provides pressurized fluid to a fuel injector 144 from a fuel tank 142 via a fuel pump 143. The fuel injector 144 is illustrated as a direct injector. Additionally or alternatively, the fuel delivery system 140 may include a port fuel injector positioned in the intake system upstream of the cylinder's intake valve 114. The fuel injector 144 may include a nozzle spraying fluid (e.g., fuel) into a targeted location in the engine at desired times in metered amounts. Injection mechanisms (e.g., solenoids, springs, valves, etc.,) in the injectors may facilitate the aforementioned fuel injection operation.

The engine 102 may be controlled at least partially by a control system 149 including controller 150. The controller 150 is shown in FIG. 1 as a conventional microcomputer including: microprocessor unit 151, input/output ports 152, read-only memory 153, random access memory 154, keep alive memory 155, and a conventional data bus. However, numerous controller arrangements have been envisioned.

The controller 150 may be configured to trigger one or more actuators and/or send commands to components. For instance, the controller 150 may trigger adjustment of the throttle 110, fuel injector 144, fuel pump 143, etc. Specifically in one example, the controller 150 may send signals to an actuator in the throttle 110 increase or decrease the flowrate of intake air into the cylinder 106. The other adjustable components receiving commands from the controller may also function in a similar manner. Therefore, the controller 150 receives signals from the various sensors and employs various actuators to adjust system operation based on the received signals and instructions stored in memory (e.g., non-transitory memory) of the controller. As another example, the controller 150 may make a logical determination regarding a positon of an actuator in a commanded component based on logic rules that are a function of a parameter (e.g., coolant temperature, manifold air pressure, engine speed, etc.) The controller may then generate a control signal that is sent to the actuator. The control signal, for instance, may be generated using a look-up table indexed to operating conditions. However, other suitable schemes for determining the make-up of control signals sent to actuators in controllable components have been envisioned.

The controller 150 may also receive signals from sensors in the vehicle 100, engine 102, etc., shown in FIG. 1. The sensors providing input into the controller may include an airflow sensor 168, a pressure sensor 170, a temperature sensor 172, an exhaust gas composition sensor 174, a pressure sensor 176, throttle position sensor 177, engine speed sensor 179, etc. Additionally, the controller 150 is also configured to receive a pedal position from a pedal position sensor 178 couples to a pedal 180 actuated by an operator 182.

FIG. 2 shows an example of a turbocharger 200 including a compressor 202 rotationally coupled to a turbine 204. However, as previously discussed, in other examples, the compressor may be driven via the crankshaft and/or an electric motor. It will be appreciated that the turbocharger 200 shown in FIG. 2 is an example of the turbocharger 113, shown in FIG. 1.

The compressor 202 includes a rotor 206 designed to rotate about a rotational axis 208. A bearing 210, shown in FIG. 3, enables the rotor's rotation. The rotor 206 includes a plurality of blades 212. An axis system 250 is illustrated in FIG. 2 as well as FIGS. 3-6 to establish a common frame of reference among the figures. The axis system 250 includes a z-axis, a y-axis, and an x-axis. The z-axis may be parallel to a gravitational axis, the y-axis may be a lateral axis, and/or the x-axis may be longitudinal axis. However, numerous orientations of the axes may be used.

The compressor 202 further includes a housing 214, an inlet 216, and an outlet 218. The inlet 216 may be coupled to and receive intake air from upstream intake system components such as intake conduits, an air filter, etc. On the other hand, the outlet 218 may be coupled to and deliver intake air to downstream intake system components such as a throttle, intake valve, intake conduits, intake manifold, etc. A scroll 220 in the compressor 202 guides compressed air from the rotor 206 to the outlet 218.

An inlet channel 222 axially extends from the inlet 216 to the rotor 206. The compressor 202 further includes a ported shroud 224 and a muffler 226 positioned therein and coupled thereto. To elaborate, the muffler 226 may be fixedly coupled to the ported shroud 224 such that the relative positions of the components remain substantially fixed, in one example. However, other attachment schemes between the ported shroud and the muffler have been contemplated. For instance, the ported shroud 224 may be removably coupled to the muffler 226. Additionally, the ported shroud 224, in one example, may circumferentially surround a portion of the inlet channel 222.

The ported shroud 224 includes a first port 228 opening into the inlet channel 222 upstream of a leading side 230 of the rotor 206. The ported shroud 224 also includes a second port 232, shown in FIG. 3, positioned downstream of the leading side 230 of the rotor 206. The ported shroud 224 functions to increase the compressor's flow range by allowing air to bleed from a section of the compressor downstream of the leading side 230 of the rotor 206 to a section upstream of the leading side of the rotor during certain flow conditions, such as when the compressor is approaching or experiencing surge. During other conditions, such as when the compressor is approaching or experiencing choke, flow through the ported shroud may be generally in a downstream direction. The flow patterns in the compressor during the different conditions are discussed in greater detail herein with regard to FIGS. 4-5. A cutting plane A-A' defining the cross-section of the view shown in FIG. 3, is indicated in FIG. 2.

FIG. 3 shows the compressor 202, turbine 204, and a shaft 300 rotationally coupling the rotor 206 in the compressor 202 to a turbine wheel 302 in the turbine 204. As previously discussed, the rotor 206 and the turbine wheel 302 rotate about axis 208, during turbocharger operation.

The inlet channel 222 upstream of the rotor 206 and the first port 228 of the ported shroud 224 opening into the inlet channel 222 upstream of the rotor 206, are again shown in FIG. 3. The second port 232 in the ported shroud 224 positioned downstream of the leading side 230 of the rotor 206 is also shown in FIG. 3. Downstream in this context refers to a general flow direction in the compressor when reverse flow in the shroud is not occurring. The second port 232 is shown extending through the housing 214 and opening into a region of the compressor adjacent to radial edges 305 of the rotor blades 212. However, other profiles of the second port 232 have been envisioned.

A ported shroud channel 304 extends between the first port 228 and the second port 232. The direction of airflow in the ported shroud channel 304 may vary depending on flow conditions. The muffler 226 is shown positioned in the ported shroud channel 304.

Specifically, in the illustrated example, a first side 306 of the muffler 226 is shown positioned in the first port 228. However, in other examples, the first side 306 of the muffler 226 may be positioned axially closer to the rotor 206.

As shown, a radius 308 of the ported shroud channel 304 decreases in an axial direction extending toward the rotor 206. The ported shroud channel 304 also includes a recess 310 positioned radially outward from the muffler 226. However, other ported shroud contours have been envisioned.

A ported shroud cover 312 is also shown in FIG. 3. The ported shroud cover is positioned axially upstream of the first port 228. Upstream in this context refers to a general flow direction in the compressor when reverse flow in the shroud is not occurring. The ported shroud cover functions to deflect flow through the ported shroud when upstream flow in the shroud is not occurring.

A support rib 314 is shown extending between an inner wall dividing the ported shroud 224 from the inlet channel 222 and the housing 214. The support rib 314 allows the wall 316 to retain a desired position and divide airflow in the compressor 202. FIG. 3 also shows the inlet 216 and the scroll 220 receiving compressed air from the rotor 206 and flowing compressor air to the compressor's outlet.

FIGS. 4 and 5 show the compressor 202 operating within different airflow ranges. Specifically, FIG. 4 shows the compressor 202 operating in a first airflow range and FIG. 5 shows the compressor 202 operating in a second airflow range different from the first airflow range. Specifically, the first airflow range may be a range with a lower mass airflow than the second airflow range. For instance, the first airflow range may be a range where the flow is approaching and/or exhibiting a surge condition. On the other hand, the second airflow range may be a range where the flow is approaching and/or exhibiting a choke condition. Specifically, in one example, the first airflow range may correspond to a compressor operating between a targeted compressor flow rate (e.g., 15-30% away from surge flow) and a surge flow condition. Continuing with such an example, the second airflow range may correspond to a condition where the compressor is operating on the right side of the peak efficiency area. Specifically, in one example, the second airflow range may correspond to a range where the compressor is approaching or operating with a choke flow condition.

In FIG. 4, arrows 400 illustrate a general direction of airflow through the ported shroud 224. Arrows 402 depict the general direction of airflow through the inlet channel 222. However, it will be understood that the flow pattern in the compressor has greater complexity that is not captured via the arrows. As shown, the airflow direction through the ported shroud 224 opposes the general direction of airflow through the inlet channel 222. In this way, recirculation flow occurs in the ported shroud, thereby reducing the likelihood of backflow across the compressor that can lead to degradation of compressor components. In the recirculation flow pattern, the muffler 226 serves to reduce noise generated in the compressor due to the profile of projections in the muffler. During the reverse flow the muffler may also increase pressure losses that will reduce the recirculation flow rate which may at least partially offset the adverse effects of the increased pressure loss.

In FIG. 5 arrows 500 illustrate a general direction of airflow through the ported shroud 224. Arrows 502 depict the general direction of airflow through the inlet channel 222. As shown, the airflow direction through the ported shroud 224 is generally in a similar axial direction to the general direction of airflow through the inlet channel 222. In this flow pattern, the losses generated by the muffler 226 are reduced when compared to other muffler designs, such as mufflers with a plurality of openings in base, for example, due to the profile of projections in the muffler.

FIG. 6 shows a detailed view of the muffler 226. The muffler 226 includes a plurality of projections 600 extending from base 602. To elaborate, the projections 600 extend radially inwards toward the rotational axis 208 of the rotor. However, in other examples, the projections may extend radially outwards from the rotational axis. The base 602 includes an interior surface 603 and an exterior surface 605. The base 602 also includes a first axial side 607 and a second axial side 609. In one example, the base may be cylindrical. However, in another example the base may taper in a direction 604 extending toward the rotor 206, shown in FIG. 3. Thus, in such an example, the base may have a conical shape. Continuing with such an example, the tapered shape of the base 602 allows the muffler 226 to seat in a recess in the ported shroud 224, shown in FIG. 3. In one example, a slot, that may be arranged along the x-axis (e.g., longitudinal axis) or a direction parallel to the x-axis, may be machined either on the support rib 314, shown in FIG. 3, or on the housing wall inside the ported shroud channel 304. In such an example, the muffler 226 may be inserted in the slot. Extension leg may be added on the muffler, in one instance, if desired. In such an example, on the upstream side of the muffler 226 (closer to first port 228), a support leg or ring, that may be angled e.g., perpendicular) with regard to the muffler body may be included in the muffler. In such an example, the muffler may be slid into the machined slots on the compressor housing near the first port 228, shown in FIG. 3.

Continuing with FIG. 6, the plurality projections 600 may be conceptually divided into sets 606. In the illustrated example, each of the sets of projections helically extends around the base 602. As the recirculation flow from the impeller flows back to the compressor, inlet through channel 304, shown in FIG. 3, some flow will enter into the outer chamber and then flow back. Relatively small turbulence flow near the projections will be generated which can break the initial flow frequency, like impeller passing frequency. Thus, the helical arrangement of the projections may generate a flow pattern which reduces noise during recirculation flow in the compressor. However, in other instances, each of the sets may be axially aligned around a circumference of the base. Thus, a first set of axially aligned projections may be offset from a second set of axially aligned projections, in such an example.

Each of the projections 600 include a first axial side 610 with a tip 612 and a second axial side 614 with an aperture 616 extending through the base 602.

Furthermore, each of the projections 600 includes a curved outer surface 618 and a curved inner surface 620, in the illustrated example. The curved surfaces allow the projection to have a dimpled type shape which reduces losses caused by the compressor when air is flowing downstream towards the rotor through the ported shroud. However, other projection contours have been envisioned such as projection with edges, planar surfaces, etc. The shape of the projections may be in the shape of a triangle, half circle, half ellipse, rectangle, square, trapezoid, etc.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 7 shows a method 700 for operating compressor. It will be appreciated that method 700 may be implemented via the engine, compressors, etc., depicted in FIGS. 1-6. However in other examples, the method 700 may be implemented by other suitable engines, compressors, components, etc. Instructions for carrying out method 700 may be at least partially executed by a controller based on instructions stored in memory (e.g., non-transitory memory) of the controller and in conjunction with signals received from engine sensor, such as the sensors described above with regard to FIG. 1. It will also be understood that the method steps may include the controller sending command signals to actuators in the commanded component, the command triggering actuators in the commanded component to adjust the component, as desired. However, it will also be appreciated that some of the method steps may be at least partially passively implemented.

At 702 the method includes determining operating conditions. The operating conditions may include engine speed, engine load, ambient temperature, intake airflow, manifold air pressure, exhaust airflow, exhaust gas temperature, throttle position, etc.

At 704 the method includes determining which intake airflow conditions are occurring in the compressor. For instance, it may be determined if the mass airflow through the compressor is within a first airflow range or a second airflow range that is less than the first airflow range. The airflow conditions may be determined based on pedal position, throttle position, manifold air pressure, intake airflow, etc. As previously discussed, the first airflow range may be a range indicating the compressor is between a target compressor flow rate and a surge flow condition (e.g., 15%-30% away from a surge condition). On the other hand, the second airflow range may be a range indicating the compressor is less than the predetermined efficiency and a choke flow condition. It will be understood that in some examples, the first and second airflow ranges may be transitioned between based on engine speed and/or load. For example, when engine speed is decreased and throttling is increased the compressor may transition from the first airflow range to the second airflow range. However, on the other hand when engine speed is increased the compressor may transition from the second airflow range to the first airflow range. It will be understood that the geometry of the shroud and the muffler may remain substantially fixed during the transition between airflow conditions. As such, active adjustments in throttle position, fuel injection, etc., may initiate the transition between the airflow conditions.

When the compressor is operating in a first airflow range the method moves to 706. At 706 the method includes operating the compressor in a first airflow range where air is recirculated through a ported shroud from a second port to a first port and a muffler positioned in the ported shroud decreases compressor noise in a selected frequency range (e.g., 20-12000 kHz). In this way, the muffler reduces noise generated in the compressor, thereby increasing customer satisfaction. During the reverse airflow conditions the muffler may also increase pressure losses that will reduce the recirculation flow rate which may at least partially offset the adverse effects of the increased pressure loss.

On the other hand, when the compressor is operating in the second airflow range the method moves to 708. At 708 the method includes operating the compressor in a second airflow range where air flows through the ported shroud from the first port to the second port. It will be understood that the design of the projections in the muffler may reduce losses when compared to other mufflers, such as mufflers with holes in a base material.

The technical effect of providing a muffler in a ported shroud of a compressor with a plurality of projections is to reduce noise in the compressor during certain flow conditions and reduce losses during other flow conditions. As a result, noise, vibration, and harshness (NVH) in the compressor are reduce during certain flow conditions while reducing flow losses caused by the muffler during other conditions.

The invention is further described in the following paragraphs. In one aspect, a compressor is provided that comprises a ported shroud including a first port positioned upstream of a leading side of a rotor and a second port positioned downstream of the leading side of the rotor; and a muffler arranged in the ported shroud and comprising a plurality of projections, where each of the plurality of projections radially extend from a base of the muffler and include an aperture extending through the base.

In another aspect, a method for operating a compressor in an engine is provided that comprises operating the compressor in a first airflow range where air is recirculated through a ported shroud from a second port to a first port and a muffler positioned in the ported shroud decreases compressor noise in a selected frequency range, where the first port is positioned upstream of a leading side of a rotor and the second port is positioned downstream of the leading side of the rotor; and operating the compressor in a second airflow range where air flows through the ported shroud from the first port to the second port. In one example, the method may further include transitioning between the first airflow range and the second airflow range depending on engine speed and/or load.

In yet another aspect, a compressor is provided that comprises a ported shroud including a first port positioned upstream of a leading side of a rotor and a second port positioned downstream of the leading side of the rotor; a muffler arranged in the ported shroud and comprising a plurality of projections; where each of the plurality of projections radially extend from a base of the muffler and include an aperture extending through the base; and where each of the plurality of projections include a curved inner surface radially extending towards a rotational axis of the compressor.

In any of the aspects or combinations of the aspects, when the compressor is operating in a first airflow range, air may be recirculated through the ported shroud from the second port to the first port and the muffler decreases compressor noise in a selected frequency range.

In any of the aspects or combinations of the aspects, when the compressor is operating in a second airflow range, air may flow through the ported shroud from the first port to the second port and the muffler.

In any of the aspects or combinations of the aspects, when the compressor is operating in the first airflow range the muffler may reduce recirculation air flow rate.

In any of the aspects or combinations of the aspects, a first axial side of each of the plurality of projections including a tip of the projection may be axially positioned further away from the rotor than a second axial side of each of the plurality of projections opposing the first axial side.

In any of the aspects or combinations of the aspects, the projection may taper in a direction toward the tip.

In any of the aspects or combinations of the aspects, each of the plurality of projections may include an inner curved surface and an outer curved surface.

In any of the aspects or combinations of the aspects, the plurality of projections may extend radially inward toward a rotational axis of the compressor.

In any of the aspects or combinations of the aspects, the plurality of projections may include a set of projections helically arranged around the base of the muffler.

In any of the aspects or combinations of the aspects, the plurality of projections may include a first row of projections axially offset from a second row of projections.

In any of the aspects or combinations of the aspects, the ported shroud may include a recess positioned radially outward from the muffler.

In any of the aspects or combinations of the aspects, a support rib in the ported shroud may be positioned axially closer to the rotor than the muffler.

In any of the aspects or combinations of the aspects, the base of the muffler may be tapered and seats in the ported shroud.

In any of the aspects or combinations of the aspects, each of the plurality of projections may include an inner curved surface extending radially toward a rotational axis of the compressor.

In any of the aspects or combinations of the aspects, each of the plurality projections may taper in a direction toward a tip.

In any of the aspects or combinations of the aspects, when the compressor is operating in a first airflow range, air may be recirculated through the ported shroud from the second port to the first port and the muffler decreases compressor noise in a selected frequency range and where when the compressor is operating in a second airflow range, air flows through the ported shroud from the first port to the second port and the muffler.

In any of the aspects or combinations of the aspects, a first axial side of each of the plurality of projections including a tip of the projection may be axially positioned further away from the rotor than a second axial side of each of the plurality of projections opposing the first axial side and where the projection tapers in a direction toward the tip.

In any of the aspects or combinations of the aspects, the compressor may be included in a hybrid vehicle.

In another representation, a compressor is provided with a ported shroud and a muffler positioned therein. The muffler includes a plurality with dimples and openings decreasing noise in while reverse airflow is occurring in the ported shroud, where the dimples radially extend from a base of the muffler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A compressor, comprising:
 a ported shroud including a first port positioned upstream of a leading side of a rotor, a second port positioned downstream of the leading side of the rotor, and a ported shroud channel extending between the first port and the second port; and
 a muffler arranged in the ported shroud channel and comprising a plurality of projections, where each of the plurality of projections radially extends from a base of the muffler and includes an aperture extending through the base.

2. The compressor of claim 1, where when the compressor is operating in a first airflow range, air is recirculated through the ported shroud from the second port to the first port and the muffler decreases compressor noise in a selected frequency range.

3. The compressor of claim 2, where when the compressor is operating in a second airflow range, air flows through the ported shroud from the first port to the second port and the muffler.

4. The compressor of claim 2, where when the compressor is operating in the first airflow range the muffler reduces recirculation air flow rate.

5. The compressor of claim 1, where a first axial side of each of the plurality of projections including a tip of the projection is axially positioned further away from the rotor than a second axial side of each of the plurality of projections opposing the first axial side.

6. The compressor of claim 5, where the projection tapers in a direction toward the tip.

7. The compressor of claim 5, where each of the plurality of projections includes an inner curved surface and an outer curved surface.

8. The compressor of claim 1, where the plurality of projections extends radially inward toward a rotational axis of the compressor.

9. The compressor of claim 1, where the plurality of projections includes a set of projections helically arranged around the base of the muffler.

10. The compressor of claim 1, where the plurality of projections includes a first row of projections axially offset from a second row of projections.

11. The compressor of claim 1, where the ported shroud includes a recess positioned radially outward from the muffler.

12. The compressor of claim 1, where a support rib in the ported shroud is positioned between the first port and the second port and radially extends across the ported shroud channel and where the support rib is positioned closer to the second port than the muffler.

13. The compressor of claim 1, where the base of the muffler is tapered and seats in the ported shroud.

14. A method for operating a compressor in an engine, comprising:
    operating the compressor in a first airflow range where air is recirculated through a ported shroud channel from a second port to a first port and a muffler positioned in the ported shroud channel decreases compressor noise in a selected frequency range, where the first port is positioned upstream of a leading side of a rotor and the second port is positioned downstream of the leading side of the rotor; and
    operating the compressor in a second airflow range where air flows through the ported shroud channel from the first port to the second port;
    where the muffler includes a plurality of projections and where each of the plurality of projections extends from a base of the muffler; and
    where a support rib radially extends across the ported shroud channel and is arranged between the first port and the second port.

15. The method of claim 14, further comprising transitioning between the first airflow range and the second airflow range depending on engine speed and/or load.

16. The method of claim 14, where each of the plurality of projections includes an inner curved surface extending radially toward a rotational axis of the compressor.

17. The method of claim 16, where each of the plurality of projections tapers in a direction toward a tip.

18. A compressor, comprising:
    a ported shroud including a first port positioned upstream of a leading side of a rotor, a second port positioned downstream of the leading side of the rotor, and a ported shroud channel extending between the first port and the second port; and
    a muffler arranged in the ported shroud channel and comprising a plurality of projections;
    where each of the plurality of projections radially extends from a base of the muffler and includes an aperture extending through the base;
    where each of the plurality of projections includes a curved inner surface radially extending towards a rotational axis of the compressor; and
    where the ported shroud includes a support rib that radially extends across a ported shroud channel and is arranged between the first port and the second port.

19. The compressor of claim 18, where when the compressor is operating in a first airflow range, air is recirculated through the ported shroud from the second port to the first port and the muffler decreases compressor noise in a selected frequency range and where when the compressor is operating in a second airflow range, air flows through the ported shroud from the first port to the second port and the muffler.

20. The compressor of claim 18, where in each of the plurality projections, a first axial side of the projection including a tip of the projection is axially positioned further away from the rotor than a second axial side of the projection opposing the first axial side and where the projection tapers in a direction toward the tip.

* * * * *